(12) United States Patent
Song et al.

(10) Patent No.: US 9,406,931 B2
(45) Date of Patent: Aug. 2, 2016

(54) POSITIVE ACTIVE MATERIAL AND POSITIVE ELECTRODE AND LITHIUM BATTERY INCLUDING POSITIVE ACTIVE MATERIAL

(71) Applicant: Samsung SDI Co., Ltd., Yongin-si, Gyeonggi-do (KR)

(72) Inventors: Mi-Ran Song, Yongin-si (KR);
Yong-Seon Kim, Yongin-si (KR);
Yong-Chul Park, Yongin-si (KR);
Gyeong-Jae Heo, Yongin-si (KR);
Do-Yu Kim, Yongin-si (KR);
Hyun-Deok Lee, Yongin-si (KR);
Jin-Hyoung Seo, Yongin-si (KR);
Min-Ju Kim, Yongin-si (KR)

(73) Assignee: SAMSUNG SDI CO., LTD., Yongin, Gyeonggi-do (KR)

( * ) Notice: Subject to any disclaimer, the term of this patent is extended or adjusted under 35 U.S.C. 154(b) by 531 days.

(21) Appl. No.: 13/827,526

(22) Filed: Mar. 14, 2013

(65) Prior Publication Data

US 2014/0038052 A1 Feb. 6, 2014

(30) Foreign Application Priority Data

Aug. 2, 2012 (KR) .................. 10-2012-0084985

(51) Int. Cl.
| | |
|---|---|
| *H01M 4/36* | (2006.01) |
| *H01M 4/131* | (2010.01) |
| *H01M 4/505* | (2010.01) |
| *H01M 4/525* | (2010.01) |
| *H01M 4/58* | (2010.01) |
| *H01M 4/02* | (2006.01) |
| *H01M 10/052* | (2010.01) |

(52) U.S. Cl.
CPC .............. *H01M 4/366* (2013.01); *H01M 4/131* (2013.01); *H01M 4/364* (2013.01); *H01M 4/505* (2013.01); *H01M 4/525* (2013.01); *H01M 4/5815* (2013.01); *H01M 4/5825* (2013.01); *H01M 10/052* (2013.01); *H01M 2004/021* (2013.01); *H01M 2004/028* (2013.01); *Y02E 60/122* (2013.01); *Y02T 10/7011* (2013.01)

(58) Field of Classification Search
CPC ..... H01M 4/366; H01M 4/364; H01M 4/505; H01M 4/525; H01M 10/052; H01M 2004/021; H01M 2004/028; H01M 4/131; H01M 4/5815; H01M 4/5825; Y02E 60/122
See application file for complete search history.

(56) References Cited

U.S. PATENT DOCUMENTS

| | | | |
|---|---|---|---|
| 6,916,580 B2 * | 7/2005 | Cho et al. ................... | 429/231.1 |
| 7,462,422 B2 | 12/2008 | Hosoya | |
| 7,608,362 B2 | 10/2009 | Choi et al. | |
| 2006/0263691 A1 | 11/2006 | Park et al. | |
| 2012/0156560 A1 | 6/2012 | Hong et al. | |

FOREIGN PATENT DOCUMENTS

| | | |
|---|---|---|
| JP | 2005-228706 A | 8/2005 |
| JP | 2006-310311 A | 11/2006 |
| KR | 10-2007-0010103 | 1/2007 |
| KR | 10-2009-0078128 A | 7/2009 |
| KR | 10-2010-0131921 A | 12/2010 |

* cited by examiner

*Primary Examiner* — Laura Weiner
(74) *Attorney, Agent, or Firm* — Knobbe Martens Olson & Bear LLP

(57) ABSTRACT

A positive active material and a lithium battery including the positive active material. The positive active material includes a large diameter active material and a small diameter active material, wherein the small diameter active material includes a Ni-based lithium-transition metal composite oxide and a coating layer including a Mn-containing compound on at least a portion of the surface thereof.

14 Claims, 1 Drawing Sheet

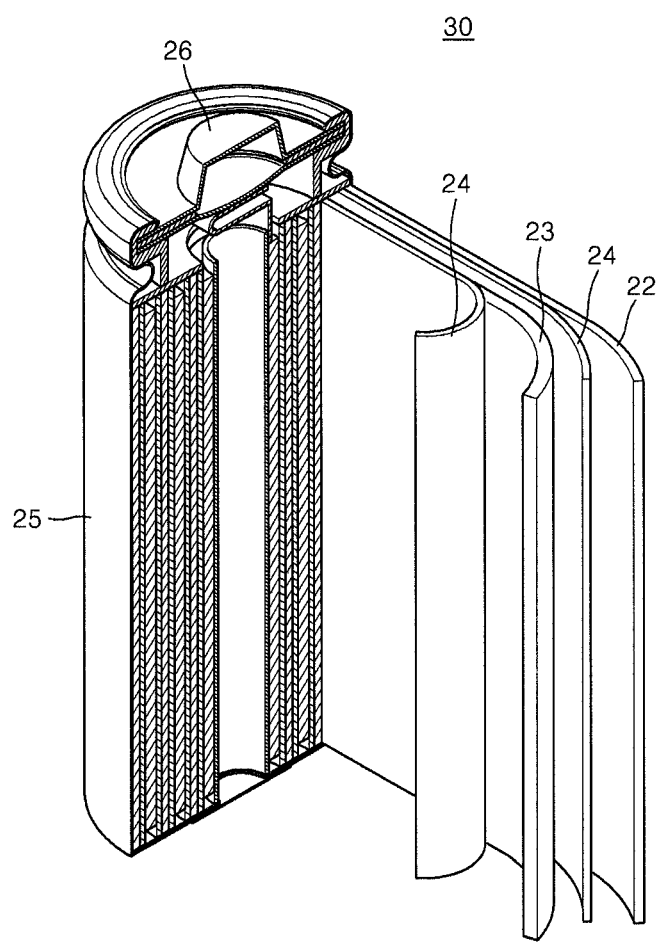

POSITIVE ACTIVE MATERIAL AND POSITIVE ELECTRODE AND LITHIUM BATTERY INCLUDING POSITIVE ACTIVE MATERIAL

CROSS-REFERENCE TO RELATED APPLICATIONS

This application claims priority to and the benefit of Korean Patent Application No. 10-2012-0084985, filed on Aug. 2, 2012, the disclosure of which is incorporated herein in its entirety by reference.

BACKGROUND

1. Field

One or more embodiments relate to positive active materials and positive electrodes and lithium batteries including the positive active materials.

2. Description of the Related Art

Lithium secondary batteries have recently drawn attention as a power source for small portable electronic devices. They use an organic electrolytic solution, and thus, have a discharge voltage that is twice or more greater than that of conventional batteries using an alkali aqueous solution, and accordingly, have high energy density.

Lithium secondary batteries generate electric energy due to oxidation and reduction reactions occurring when lithium ions are intercalated into/deintercalated from a positive electrode and a negative electrode, each including an active material that enables intercalation and deintercalation of lithium ions, with an organic electrolytic solution or a polymer electrolytic solution interposed between the positive electrode and the negative electrode.

As a positive active material of a lithium secondary battery, $LiCoO_2$ has been widely used. However, $LiCoO_2$ is prepared at high manufacturing costs and it is difficult to have a stable supply thereof. Thus, as an alternative, a positive active material prepared in a composite with Ni or Mn has been developed.

As for a nickel-based composite oxide, a capacity per unit volume may be increased by increasing the amount of Ni or increasing a mass density of a positive active material. However, there is still a need to develop a positive active material with an improved packing density and good thermal stability and capacity.

SUMMARY

One or more embodiments include positive active materials that increase the densities of positive electrodes and have improved thermal stabilities.

One or more embodiments include positive electrodes including the positive active materials.

One or more embodiments include lithium batteries including the positive active materials.

Additional aspects will be set forth in part in the description which follows and, in part, will be apparent from the description, or may be learned by practice of the presented embodiments.

According to one or more embodiments, a positive active material includes a large diameter active material and a small diameter active material, wherein the small diameter active material includes a Ni-based lithium-transition metal composite oxide and includes a coating layer comprising a Mn-containing compound on at least a portion of a surface thereof.

The Mn-containing compound may have a spinel crystal structure.

The Mn-containing compound may be a lithium manganese oxide represented by Formula 1:

$$Li_{1+a}Mn_{2-b}M_bO_{4-c}A_c \qquad \text{<Formula 1>}$$

wherein

M is at least one element selected from Al, Mg, Ni, Co, Zn, Ca, Sr, Cu, Zr, P, Fe, Ga, In, Cr, Ge, and Sn, A is at least one element selected from O, F, S, and P, $0 \leq a \leq 0.3$, $0 \leq b \leq 0.2$, and $0 \leq c \leq 0.02$.

An amount of Mn may be about 0.01 to about 0.1 moles based on 1 mole of the small diameter active material.

The small diameter active material may include a diffusion portion into which at least a portion of the Mn-containing compound is diffused. Herein, the diffusion portion may be formed to a predetermined thickness from the surface of the small diameter active material.

An amount of Ni may be at least 0.5 moles based on 1 mole of the Ni-based lithium-transition metal composite oxide.

The Ni-based lithium-transition metal composite oxide may be represented by Formula 2:

$$Li_xNi_{1-y'}M'_{y'}O_{2-z}X_z \qquad \text{<Formula 2>}$$

wherein

M' is at least one metal selected from Co, Al, Mn, Mg, Cr, Fe, Ti, Zr, Mo, and alloys thereof, X is an element selected from O, F, S, and P, $0.8 \leq x \leq 1.2$, $0 \leq y \leq 0.5$, and $0 \leq z \leq 2$.

The Ni-based lithium-transition metal composite oxide may be represented by Formula 3:

$$Li_xNi_{1-y'-y''}Co_{y'}Al_{y''}O_2 \qquad \text{<Formula 3>}$$

wherein $0.8 \leq x \leq 1.2$, $0 < y'+y'' \leq 0.2$, and $0 < y'' \leq 0.1$

The large diameter active material may include at least one selected from $LiCoO_2$, $LiNiO_2$, $LiMnO_2$, $LiMn_2O_4$, $Li(Ni_aCo_bAl_c)O_2$, $Li(Ni_aCo_bMn_c)O_2$ where $0<a<1$, $0<b<1$, $0<c<1$, and $a+b+c=1$, $LiNi_{1-y}Co_yO_2$, $LiCo_{1-y}Mn_yO_2$, $LiNi_{1-y}Mn_yO_2$ where $0 \leq Y<1$, $Li(Ni_aCo_bMn_c)O_4$ where $0<a<2$, $0<b<2$, $0<c<2$, and $a+b+c=2$, $LiMn_{2-z}Ni_zO_4$, $LiMn_{2-z}Co_zO_4$ where $0<Z<2$, $LiCoPO_4$, $LiNiO_2$, $LiFeO_2$, $LiFePO_4$, $V_2O_5$, TiS, and MoS.

The large diameter active material may include a Ni-containing lithium-transition metal composite oxide. For example, the large diameter active material may include a Ni-containing lithium-transition metal composite oxide that is identical to or different from that of the small diameter active material.

An average particle diameter (D50) ratio of the large diameter active material to the small diameter active material may be about 2:1 to about 100:1.

An average particle diameter (D50) of the large diameter active material may be about 1 to about 50 µm.

An average particle diameter (D50) of the small diameter active material may be about 0.05 to about 10 µm.

A weight ratio of the large diameter active material to the small diameter active material may be about 50:50 to about 99:1.

According to one or more embodiments, a positive electrode includes the positive active material described above.

According to one or more embodiments, a lithium battery includes: a positive electrode including the positive active material described above; a negative electrode facing the positive electrode; and an electrolyte disposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawing in which:

FIG. 1 is a schematic diagram illustrating a structure of a lithium battery according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail.

According to an embodiment, a positive active material includes a large diameter active material and a small diameter active material, wherein the small diameter active material includes a Ni-based lithium-transition metal composite oxide and a coating layer including a Mn-containing compound on at least a portion of the surface thereof.

To increase capacity per volume of an electrode for a lithium battery, the electrode density should be increased. For example, an active material itself having a high density may be used or the packing density of the active material may be increased by reducing a gap between active material particles. The density of the active material itself is an intrinsic property of the active material, and thus, may be a value determined when the type of an active material is selected by considering capacity per mass or other physical properties. Therefore, it is important to increase the packing density of the active material.

In the present embodiment, the positive active material includes a large diameter active material and a small diameter active material. In such a bimodal system, small diameter active material particles may fill the space between large diameter active material particles, and thus, a more compact filling is obtained, which results in a decreased gap between the large and small diameter active material particles. Accordingly, the electrode density may be increased. In general, small particles may have a weaker thermal stability than that of large particles. In this embodiment, however, to control the thermal stability of the small diameter active material, the positive active material may include a coating layer including a Mn-containing compound on at least a portion of the surface of the small diameter active material, thereby increasing the electrode density and obtaining the thermal stability.

The small diameter active material may be any lithium-transition metal composite oxide that is generally used as a positive active material in the art. In particular, Ni-based lithium-transition metal composite oxide that has high capacity and is stable at high temperatures may be used. According to one embodiment, the amount of Ni may be at least 0.5 moles based on 1 mole of the Ni-based lithium-transition metal composite oxide.

For example, the Ni-based lithium-transition metal composite oxide used as a small diameter active material may be represented by Formula 2:

$$Li_xNi_{1-y'}M'_{y'}O_{2-z}X_z \qquad \text{<Formula 2>}$$

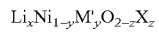

wherein

M' is at least one metal selected from Co, Al, Mn, Mg, Cr, Fe, Ti, Zr, Mo, and alloys thereof, X is an element selected from O, F, S, and P, $0.8 \leq x \leq 1.2$, $0 \leq y \leq 0.5$, and $0 \leq z \leq 2$.

Among these Ni-based lithium-transition metal composite oxides, a Ni—Co—Al-based oxide with high thermal stability may be used as the small diameter active material. For example, the Ni—Co—Al-based oxide may be represented by Formula 3:

$$Li_xNi_{1-y'-y''}Co_{y'}Al_{y''}O_2 \qquad \text{<Formula 3>}$$

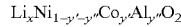

wherein $0.8 \leq x \leq 1.2$, $0 < y'+y'' \leq 0.2$ and $0 < y'' \leq 0.1$.

The small diameter active material includes a coating layer including a Mn-containing compound on at least a portion of the surface thereof. The coating layer may improve the thermal stability of a relatively unstable small diameter active material as compared to a large diameter active material. The Mn-containing compound may have a spinel crystal structure, and, for example, may be a lithium manganese oxide represented by Formula 1:

$$Li_{1+a}Mn_{2-b}M_bO_{4-c}A_c \qquad \text{<Formula 1>}$$

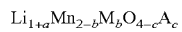

wherein

M is at least one element selected from Al, Mg, Ni, Co, Zn, Ca, Sr, Cu, Zr, P, Fe, Ga, In, Cr, Ge, and Sn, A is at least one element selected from O, F, S, and P, $0 \leq a \leq 0.3$, $0 \leq b \leq 0.2$, and $0 \leq c \leq 0.02$.

The lithium manganese oxide of Formula 1 may be, for example, $LiMn_2O_4$.

The coating layer including an Mn-containing compound may be continuously or discontinuously formed on the surface of the small diameter active material, and at least a portion of the Mn-containing compound of the coating layer may diffuse into the small diameter active material by a heat-treatment process. By the diffusion of the Mn-containing compound into the small diameter active material, a diffusion portion may be formed to a predetermined thickness from the surface of the small diameter active material.

When the amount of the coating layer is too large with respect to the small diameter active material, the electrode capacity may be reduced. On the other hand, when the amount of the coating layer is too small with respect to the small diameter active material, it may be difficult to obtain thermal stability. Therefore, the coating layer may be formed in an appropriate amount by considering capacity and thermal stability. For example, the coating layer may be formed such that the amount of Mn contained in the coating layer is about 0.01 to about 0.1 moles based on 1 mole of the small diameter active material.

The small diameter active material is mixed with the large diameter active material and minimizes a gap between positive active material particles, which results in an increased positive electrode density.

As the large diameter active material, any compound that intercalates and/or deintercalates lithium may be used. For example, any lithium-transition metal composite oxide that is generally used as a positive active material in the art may be used. Examples of the lithium-transition metal composite oxide include $LiCoO_2$, $LiNiO_2$, $LiMnO_2$, $LiMn_2O_4$, $Li(Ni_aCo_bAl_c)O_2$, $Li(Ni_aCo_bMn_c)O_2$ where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ where $0\leq Y<1$, $Li(Ni_aCo_bMn_c)O_4$ where $0<a<2$, $0<b<2$, $0<c<2$ and $a+b+c=2$, $LiMn_{2-z}Ni_zO_4$, $LiMn_{2-z}Co_zO_4$ where $0<Z<2$, $LiCoPO_4$, $LiNiO_2$, $LiFeO_2$, $LiFePO_4$, $V_2O_5$, TiS, and MoS.

According to one embodiment, the large diameter active material may include a Ni-based lithium-transition metal composite oxide that has high capacity and is stable at high temperatures, among these lithium-transition metal composite oxides. In an embodiment, as the large diameter active material, a Ni-based lithium-transition metal composite oxide that is identical to or different from the small diameter active material may be used. For example, the large diameter active material may be formed of the Ni-based lithium-transition metal composite oxide of Formula 1 or 2.

The above-listed lithium-transition metal composite oxide may be used alone or at least two of these lithium-transition metal composite oxides may be used in combination or in composite form, to form the large diameter active material.

When the large and small diameter active materials with different average particle diameters are mixed together, in order to obtain a more compact filling of the positive active material, it is important to fill the space between the large diameter active material particles with the small diameter active material particles. Thus, the particles sizes of the large and small diameter active materials are determined so as to effectively utilize the space.

For example, an average particle diameter (D50) ratio of the large diameter active material to the small diameter active material may be about 2:1 to about 100:1. For example, in some embodiments, the D50 ratio of the large diameter active material to the small diameter active material may be about 2:1 to about 50:1, and in other embodiments, the D50 ratio of the large diameter active material to the small diameter active material may be about 3:1 to about 20:1.

In addition, the large diameter active material may have a D50 of about 1 to about 50 μm, and the small diameter active material may have a D50 of about 0.05 to about 10 μm. When the large and small diameter active materials with the particle sizes within the ranges described above are mixed together, the space between positive active material particles may be effectively utilized and a good packing density of the positive active material may be obtained.

As used herein, the term "average particle diameter (D50)" means a cumulative average particle diameter corresponding to 50 volume % in a cumulative particle size distribution curve based on a total volume of 100%. The D50 may be measured using one of various known methods in the art, for example, a particle size analyzer, or from a transmission electron microscopic (TEM) image or a scanning electron microscopic (SEM) image. Also, the D50 may be easily measured by analyzing data measured by a measuring device using a dynamic light-scattering method to count the number of particles for each particle size range and calculating an average value thereof.

A mixing weight ratio of the large diameter active material to the small diameter active material may be about 50:50 to 99:1. Particularly, the mixing weight ratio of the large diameter active material to the small diameter active material may be about 60:40 to 90:10. More particularly, the mixing weight ratio of the large diameter active material to the small diameter active material may be about 70:30 to 80:20. When the mixing weight ratio of the large diameter active material to the small diameter active material is within these ranges, a final packing density of the positive active material may be increased.

The positive active material described above may be prepared using various methods known in the art. For example, the positive active material may be prepared by coating the small diameter active material with a Mn-containing compound and mixing the coated small diameter active material with the large diameter active material.

In this regard, the coating of the small diameter active material may be performed using one of various known coating methods in the art. For example, first, a slurry, in which a small diameter active material is dispersed, is prepared. Separately, a manganese element source, such as manganese sulfate, manganese nitrate, manganese carbonate, manganese halogenide, or the like, is dissolved in a solvent to prepare a solution. The solution is added to the slurry and the resulting solution is stirred. Then, the stirred solution is dried and heat-treated to obtain a small diameter active material with the Mn-containing compound coated on a surface thereof. For example, the heat-treatment process may be performed at a temperature of about 500 to about 800° C. for about 0.5 to about 5 hours. When the heat-treatment temperature is within the ranges described above, a decrease in capacity is small, and a small diameter active material including a smooth surface coating layer on the surface thereof may be obtained.

The mixing of the large and small diameter active materials may be performed using a general mixing method. For example, the mixing process may be performed using a mortar, a mill, or a mixer. For smooth mixing thereof, a solvent may be added. The solvent may be water, alcohol, or a mixture thereof. The alcohol may be, for example, $C_1$ to $C_4$ lower alcohol. In particular, the alcohol may be methanol, ethanol, isopropanol, or a mixture thereof.

According to another embodiment, a positive electrode includes the positive active material described above.

According to another embodiment, a lithium battery includes a positive electrode including the positive active material described above; a negative electrode facing the positive electrode, and an electrolyte disposed between the positive electrode and the negative electrode.

The positive electrode includes the positive active material described above, and may be manufactured as follows: The positive active material described above, a conductive material, and a binder are mixed in a solvent to prepare a positive active material composition. Then, the positive active material composition is molded in a certain form or coated on a current collector, such as a copper foil current collector.

The conductive material used in the positive active material composition forms a conductive path in the positive active material, thereby increasing the electrical conductivity of the positive active material. As the conductive material, any conductive material that is generally used in a lithium battery may be used. Examples of the conductive material include carbonaceous materials such as carbon black, acetylene black, Ketjen black, and carbon fibers (e.g., gas phase grown carbon fibers); metallic materials such as metal powders or metal fibers of copper, nickel, aluminum, and silver; conductive polymers such as polyphenylene derivatives; and mixtures thereof. The amount of the conductive material may be appropriately adjusted. For example, a weight ratio of the positive active material to the conductive material may be about 99:1 to about 90:10.

The binder used in the positive active material composition may aid a bond between the positive active material and the conductive material and a bond between the positive active material and the current collector. The amount of the binder may be about 1 to about 50 parts by weight based on 100 parts by weight of the positive active material. For example, the amount of the binder may be about 1 to about 30 parts by weight, about 1 to about 20 parts by weight, or about 1 to about 15 parts by weight, based on 100 parts by weight of the positive active material. Examples of the binder are polyvinylidenefluoride, polyvinylidenechloride, polybenzimidazole, polyimide, polyvinylacetate, polyacrylonitrile, polyvinylalcohol, carboxymethylcellulose (CMC), starch, hydroxypropylcellulose, regenerated cellulose, polyvinylpyrrolidone, polyethylene, polypropylene, polystyrene, polymethylmethacrylate, polyaniline, acrylonitrile butadiene styrene copolymer, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutyleneterephthalate, ethylene-propylene-diene terpolymer (EPDM), sulfonated EPDM, styrene butadiene rubber, fluoride rubber, various copolymers, and the like.

The solvent may be N-methylpyrrolidone (NMP), acetone, water, or the like. The amount of the solvent may be 10 to 100 parts by weight based on 100 parts by weight of the positive active material. If the amount of the solvent is within this range, an active material layer may be easily formed.

Also, the current collector may typically be formed in a thickness of about 3 to about 500 μm. The current collector is not particularly limited as long as the current collector does not cause a chemical change in a battery and has conductivity. Examples of a material that forms the current collector include copper, stainless steel, aluminum, nickel, titanium, calcined carbon, copper and stainless steel that are surface-treated with carbon, nickel, titanium, silver, or the like, an alloy of aluminum and cadmium, etc. Also, an uneven micro structure may be formed on the surface of the current collector to enhance a binding force with the positive active material. Also, the current collector may be used in various forms including a film, a sheet, a foil, a net, a porous structure, a foaming structure, a non-woven structure, and the like.

The prepared positive active material composition may be directly coated on a current collector to form a positive electrode plate, or may be cast onto a separate support and a positive active material film separated from the support is laminated on a copper foil current collector, to obtain a positive electrode plate. However, the positive electrode may also have a shape other than the above-listed examples.

The positive active material composition may be printed on a flexible electrode substrate to manufacture a printable battery, in addition to the use in manufacturing a lithium battery.

Separately, for the manufacture of a negative electrode, a negative active material composition prepared by mixing a negative active material, a binder, a solvent, and optionally, a conductive material is prepared.

The negative active material may be any material that is generally used in the art. Non-limiting examples of the negative active material include lithium metal, a metal that is alloyable with lithium, a transition metal oxide, a material for doping or undoping lithium, and a material for reversibly intercalating or deintercalating lithium ions.

Examples of the transition metal oxide include tungsten oxide, molybdenum oxide, titanium oxide, lithium titanium oxide, vanadium oxide, lithium vanadium oxide, and the like.

Examples of the material for doping or undoping lithium include Si; $SiO_x$ where $0<x<2$; Si—Y alloy where Y is an alkali metal, an alkali earth metal, a Group XIII element, a Group XIV element, a transition metal, a rare-earth element, or a combination thereof and is not Si; Sn; $SnO_2$; and Sn—Y where Y is an alkali metal, an alkali earth metal, a Group XIII element, a Group XIV element, a Group XV element, a Group XVI element, a transition metal, a rare-earth element, or a combination thereof and is not Sn. Also, at least one of the materials for doping or undoping lithium may be used in combination with $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material for reversibly intercalating or deintercalating lithium ions may be any one of various carbonaceous negative active materials that are generally used in a lithium battery. Examples of the material for reversibly intercalating or deintercalating lithium include crystalline carbon, amorphous carbon, and combinations thereof. Examples of the crystalline carbon include natural graphite and artificial graphite, each of which has an amorphous shape, a plate shape, a flake shape, a spherical shape, or a fiber shape. Examples of the amorphous carbon include soft carbon (low-temperature calcined carbon), hard carbon, meso-phase pitch carbide, and calcined coke.

The conductive agent, the binder, and the solvent included in preparing the negative active material composition may be identical to those included in the positive active material composition. In some cases, a plasticizer may be further added to the positive active material composition and the negative active material composition to form pores in a corresponding electrode plate. Amounts of the negative active material, the conductive agent, the binder, and the solvent may be at the same levels used in a conventional lithium battery.

A negative electrode current collector may have a thickness of about 3 to about 500 μm, and may be any of various current collectors that do not cause a chemical change in a battery and has high conductivity. Examples of the negative electrode current collector include stainless steel, aluminum, nickel, titanium, calcined carbon, and aluminum and stainless steel that are surface-treated with carbon, nickel, titanium, silver, or the like. The negative electrode current collector may have an uneven micro structure at its surface to enhance a binding force with the negative active material. Also, the current collector may be used in various forms including a film, a sheet, a foil, a net, a porous structure, a foaming structure, a non-woven structure, and the like.

The prepared negative active material composition may be directly coated on the negative electrode current collector to form a negative electrode plate, or may be cast onto a separate support and a negative active material film separated from the support is laminated on the negative electrode current collector, such as a copper foil, to obtain a negative electrode plate.

The positive electrode may be separated from the negative electrode by a separator, and the separator may be any of various separators that are typically used in a lithium battery. In particular, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be nonwoven or woven. The separator may have a pore size of about 0.01 to about 10 μm and a thickness of about 5 to about 300 μm.

A lithium salt-containing non-aqueous based electrolyte includes a non-aqueous electrolytic solution and lithium. Examples of the non-aqueous electrolyte include a non-aqueous electrolytic solution, an organic solid electrolyte, and an inorganic solid electrolyte.

As the non-aqueous electrolytic solution, a non-protogenic organic solvent may be used. Examples of the non-protogenic organic solvent include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides, sulfates and silicates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is commonly used in a lithium battery, and that is soluble in the above-described lithium salt-containing non-aqueous electrolyte. For example, the lithium salt includes at least one selected from $LiCl$, $LiBr$, $LiI$, $LiClO_4$, $LiBF_4$, $LiB_{10}Cl_{10}$, $LiPF_6$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenylborate, and lithium imide.

Lithium batteries may be classified as lithium ion batteries, lithium ion polymer batteries, and lithium polymer batteries according to the types of a separator and electrolyte used therein. In addition, lithium batteries may be classified as a cylindrical type, a rectangular type, a coin type, and a pouch type according to a battery shape, and may also be classified as a bulk type and a thin film type according to a battery size. Lithium batteries may be used either as primary lithium batteries or secondary lithium batteries.

A method of manufacturing a lithium battery is widely known in the art, and a detailed description thereof will not be provided herein.

FIG. 1 is a schematic diagram illustrating a structure of a lithium battery 30 according to an embodiment.

Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25, and the battery case 25 is sealed by a sealing member 26, thereby completing the manufacture of the lithium battery 30. The battery case 25 may have a cylindrical shape, a rectangular shape, or a thin-film shape. The lithium battery 30 may be a lithium ion battery.

The lithium battery may be suitable for use as power sources for electric vehicles and power tools requiring a high capacity, a high-power output, and high temperature operability, in addition to power sources for general mobile phones and portable computers, and may be coupled to existing internal combustion engines, fuel cells, or super-capacitors to be used in hybrid vehicles. In addition, the lithium battery may be used in other applications requiring a high-power output, a high voltage, and high temperature operability.

One or more embodiments will now be described in more detail with reference to the following examples. However, these examples are not intended to limit the scope of the one or more embodiments.

Example 1

Large and small particles of a nickel-cobalt-aluminum oxide ($LiNi_{0.8}Co_{0.15}Al_{0.05}O_2$, NCA) were prepared. A D50 of the large particles was 20 μm, and the D50 of the small particles was 5 μm. To surface-treat the small particles, first, the small particles were dispersed in 1 kg of water and stirred to prepare a slurry. Separately, 5 g of manganese sulfate was dissolved in 100 g of water, and the resulting solution was added to the slurry and the resultant mixture was then stirred for 30 minutes and dried in an oven at 120° C. for 5 hours. Thereafter, the dried powder was heat-treated at 600° C. for 1 hour to obtain NCA small particles.

The coated small particles and the large particles were mixed at a weight ratio of 3:7 to prepare a mixed powder for a positive active material. The mixed powder, polyvinylidenefluoride as a binder, and powder-type acetylene black as a conductive material were dispersed in N-methylpyrrolidone as a solvent at a weight ratio of 96:2:2 to prepare a positive electrode slurry. The positive electrode slurry was coated on an aluminum foil to a thickness of 60 μm to prepare a thin positive electrode plate. The thin positive electrode plate was dried at 135° C. for 3 hours or longer and pressed, thereby completing the manufacture of a positive electrode.

Next, the positive electrode was assembled with a Li metal as a counter electrode and an electrolyte containing a mixed solvent including ethylene carbonate (EC), ethyl methyl carbonate (EMC), and dimethyl carbonate (DMC) at a volume ratio of 3:3:4 and 1.5 M of $LiPF_6$.

A separator comprising a porous polyethylene (PE) film was interposed between the positive electrode and a negative electrode to form a battery assembly. Thereafter, the battery assembly was wound and pressed and placed in a battery case, and an electrolytic solution was injected into the battery case, thereby completing the manufacture of a lithium battery (coin half-cell, 2016 type).

Comparative Example 1

A lithium battery was manufactured in the same manner as in Example 1, except that uncoated small particles and large particles were used.

Comparative Example 2

A lithium battery was manufactured in the same manner as in Example 1, except that both small particles and large particles were coated with a lithium manganese oxide by using the same method used in Example 1.

Comparative Example 3

A lithium battery was manufactured in the same manner as in Example 1, except that only uncoated large particles were used as a positive active material.

Comparative Example 4

A lithium battery was manufactured in the same manner as in Example 1, except that only uncoated small particles were used as a positive active material.

Comparative Example 5

A lithium battery was manufactured in the same manner as in Example 1, except that only small particles coated with a lithium manganese oxide were used as a positive active material.

Comparative Example 6

A lithium battery was manufactured in the same manner as in Example 1, except that large particles coated with a lithium manganese oxide and uncoated small particles were used as a positive active material.

Evaluation Example 1

Electrode Density Measurement 3 g of each of positive active material powders used in Example 1 and Comparative Examples 1 to 6 was put in a mold with an area of 1.2 cm2 and packed therein at a pressure of 2.5 ton/cm2. Then, a density of the resultant material was measured, and the results are shown in Table 1 below.

Evaluation Example 2

Discharge Capacity Measurement

Each of the lithium batteries manufactured according to Example 1 and Comparative Examples 1 to 6 was charged with a constant current of 1000 mA at a rate of approximately 70 mA per 1 g of the positive active material until the voltage of the corresponding battery reached 4.3 V with respect to a Li electrode. After the charging was completed, each lithium battery had a pause period of approximately 30 minutes. Then, the lithium battery was discharged with a constant current at a rate of approximately 70 mA per 1 g of the positive active material until the voltage thereof reached 2.75 V to obtain a discharge capacity per gram. The discharge capacity test results are shown in Table 1 below.

Evaluation Example 3

Exothermic Property Measurement

The lithium batteries of Example 1 and Comparative Examples 1 to 6 were charged in a constant current (CC)-constant voltage (CV) mode, and each charged lithium battery was then disassembled so as not to be short-circuited. Subsequently, the obtained Li ion-charged positive electrode plate was washed with a DMC solution and then dried. Next, an active material was collected from each dried positive electrode plate and exothermic properties thereof were evaluated by differential scanning calorimetry (DSC). The evaluation results are shown in Table 1 below.

TABLE 1

|  | Pellet density (g/cm$^3$) | Discharge capacity (mA/g) | Instant heating value (W/g) | Maximum exothermic temperature (° C.) |
| --- | --- | --- | --- | --- |
| Example 1 | 3.60 | 191 | 11.7 | 262 |
| Comparative Example 1 | 3.59 | 191 | 18.5 | 235 |
| Comparative Example 2 | 3.60 | 184 | 11.5 | 267 |
| Comparative Example 3 | 3.27 | 190 | 12.3 | 252 |
| Comparative Example 4 | 3.15 | 193 | 22.5 | 230 |
| Comparative Example 5 | 3.18 | 191 | 13.2 | 255 |
| Comparative Example 6 | 3.60 | 186 | 17.9 | 244 |

As shown in Table 1, the positive active materials used in Example 1 and Comparative Examples 1 and 2 having bimodal structures exhibited an improved packing density of each positive active material powder. The lithium battery of Example 1 had a higher capacity than that of the lithium battery of Comparative Example 2 and had the same capacity as that of the lithium battery of Comparative Example 1.

The lithium battery of Example 1 exhibited a smaller instant heating value in the DSC than that of the lithium battery of Comparative Example 1, resulting in an improved thermal stability, while the lithium battery of Example 1 had almost the same instant heating value as that of the lithium battery of Comparative Example 2.

In addition, the lithium battery of Example 1 had a higher maximum exothermal temperature than that of the lithium batteries of Comparative Examples 1 and 4, resulting in an improved heat resistance. In comparison to this, the lithium battery of Comparative Example 2 had a good thermal stability, but exhibited poor capacity, and the lithium battery of Comparative Example 3 had a good thermal stability, but exhibited a significantly reduced density.

In addition, the lithium battery of Example 1 exhibited a much higher capacity and thermal stability than those of the lithium battery of Comparative Example 6.

From the results, it is confirmed that the NCA positive active material having a bimodal structure in which only a small diameter active material is coated and a large diameter active material is not coated exhibits excellent properties in terms of electrode density, capacity, and thermal stability.

As described above, according to the one or more of the above embodiments, a positive active material may improve a positive electrode density and have a thermal stability.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A positive active material comprising:
   a first active material and a second active material,
   wherein an average particle size of the first active material is larger than that of the second active material,
   wherein the second active material comprises a Ni-based lithium-transition metal composite oxide and a coating layer comprising a Mn-containing compound on at least a portion of the surface thereof,
   wherein the first active material comprises at least one selected from $LiCoO_2$, $LiNiO_2$, $LiMnO_2$, $LiMn_2O_4$, $Li(Ni_aCo_bAl_c)O_2$, $Li(Ni_aCo_bMn_c)O_2$ where $0<a<1$, $0<b<1$, $0<c<1$, and $a+b+c=1$, $LiNi_{1-y}Co_yO_2$, $LiCo_{1-y}Mn_yO_2$, $LiNi_{1-y}Mn_yO_2$ where $0\leq Y<1$, $Li(Ni_aCo_bMn_c)O_4$ where $0<a<2$, $0<b<2$, $0<c<2$, and $a+b+c=2$, $LiMn_{2-z}Ni_zO_4$, $LiMn_{2-z}Co_zO_4$ where $0<Z<2$, $LiCoPO_4$, $LiNiO_2$, $LiFeO_2$, $LiFePO_4$, $V_2O_5$, TiS, and MoS,
   wherein an average particle diameter (D50) of the first active material is about 1 to about 50 μm,
   wherein an average particle diameter (D50) of the second active material is about 0.05 to about 10 μm, and
   wherein the Mn-containing compound is a lithium manganese oxide represented by Formula 1:

$$Li_{1+a}Mn_{2-b}M_bO_{4-c}A_c \qquad <\text{Formula 1}>$$

wherein M is at least one element selected from Al, Mg, Ni, Co, Zn, Ca, Sr, Cu, Zr, P, Fe, Ga, In, Cr, Ge, and Sn,
   A is at least one element selected from F, S, and P,
   $0\leq a\leq 0.3$, $0\leq b\leq 0.2$, and $0\leq c\leq 0.02$.

2. The positive active material of claim 1, wherein the Mn-containing compound has a spinel crystal structure.

3. The positive active material of claim 1, wherein an amount of Mn is about 0.01 to about 0.1 moles based on 1 mole of the second active material.

4. The positive active material of claim 1, wherein the second active material comprises a diffusion portion into which at least a portion of the Mn-containing compound is diffused.

5. The positive active material of claim 4, wherein the diffusion portion is formed to a predetermined thickness from the surface of the second active material.

6. The positive active material of claim 1, wherein the amount of Ni is at least 0.5 moles based on 1 mole of the Ni-based lithium-transition metal composite oxide.

7. The positive active material of claim 1, wherein the Ni-based lithium-transition metal composite oxide is represented by Formula 2:

$$Li_xNi_{1-y}M'_yO_{2-z}X_z \qquad <\text{Formula 2}>$$

wherein M' is at least one metal selected from Co, Al, Mn, Mg, Cr, Fe, Ti, Zr, Mo, and alloys thereof,
X is an element selected from F, S, and P,
$0.8\leq x\leq 1.2$, $0\leq y\leq 0.5$, and $0\leq z\leq 2$.

8. The positive active material of claim 1, wherein the Ni-based lithium-transition metal composite oxide is represented by Formula 3:

$$Li_xNi_{1-y'-y''}Co_{y'}Al_{y''}O_2 \qquad <\text{Formula 3}>$$

wherein $0.8\leq x\leq 1.2$, $0<y'+y''\leq 0.2$, and $0<y''\leq 0.1$.

9. The positive active material of claim 1, wherein the first active material comprises a Ni-based lithium-transition metal composite oxide that is identical to or different from that of the second active material.

10. The positive active material of claim 1, wherein an average particle diameter (D50) ratio of the first active material to the second active material is about 2:1 to about 100:1.

11. The positive active material of claim 1, wherein the (D50) ratio of the first active material to the second active material may be about 3:1 to about 20:1.

12. The positive active material of claim 1, wherein the weight ratio of the first active material to the second active material is from about 50:50 to about 99:1.

13. A positive electrode comprising the positive active material of claim 1.

14. A lithium battery comprising:
   a positive electrode comprising the positive active material of claim 1;
   a negative electrode facing the positive electrode; and
   an electrolyte disposed between the positive electrode and the negative electrode.

* * * * *